United States Patent [19]

Thomas

[11] 4,347,335
[45] Aug. 31, 1982

[54] HIGH BOND STRENGTH AQUEOUS PHENOL MODIFIED POLYESTER COATING COMPOSITION

[75] Inventor: Charles H. Thomas, Monroeville, Pa.

[73] Assignee: Westinghouse Electric Corp., Pittsburgh, Pa.

[21] Appl. No.: 226,339

[22] Filed: Jan. 19, 1981

[51] Int. Cl.³ .......................... C09D 3/52; C09D 3/56; C09D 3/66
[52] U.S. Cl. .................................... 524/538; 428/458; 428/460; 524/541
[58] Field of Search ............... 260/20, 22 CQ, 22 TN; 428/458, 460

[56] References Cited

U.S. PATENT DOCUMENTS

| | | | |
|---|---|---|---|
| 2,977,333 | 3/1961 | Runk et al. | 260/20 |
| 3,080,331 | 3/1963 | Thielking | 260/20 |
| 3,108,083 | 10/1963 | Laganis | 260/20 |
| 3,523,820 | 8/1970 | Sheffer | 260/20 |
| 4,130,520 | 12/1978 | Thomas | 260/29.2 E |
| 4,179,420 | 12/1979 | Laganis | 260/21 |
| 4,196,109 | 4/1980 | Laganis | 260/20 |

FOREIGN PATENT DOCUMENTS

| | | | |
|---|---|---|---|
| 496200 | 9/1953 | Canada | 260/20 |
| 54-156097 | 12/1979 | Japan | 260/20 |
| 55829 | 8/1968 | Poland | 260/20 |

OTHER PUBLICATIONS

Amoco Chemical Corp. Bulletin "TMA-120A/Resins WS-549/WS-5490".

Primary Examiner—Ronald W. Griffin
Attorney, Agent, or Firm—D. P. Cillo

[57] ABSTRACT

A high bond strength, water reducible modified polyester resin composition is disclosed which comprises: (I) a polyester resin consisting essentially of the reaction product of a: (a) aromatic dicarboxylic acid or mixtures thereof; (b) tris (2 hydroxy alkyl) isocyanurate, organic polyhydric alcohol containing more than two hydroxyl groups or mixtures thereof; (c) saturated fatty acid, and (d) tricarboxylic acid and II additive consisting essentially of: (a) 8 wt. % to 30 wt. %, based on 100% polyester solids, of an aqueous solution of a water soluble, unmodified phenol-formaldehyde resin having an average molecular weight of below about 275; and (b) 20 wt. % to 55 wt. %, based on the polyester solids of water soluble urea-formaldehyde condensation products.

9 Claims, No Drawings

HIGH BOND STRENGTH AQUEOUS PHENOL MODIFIED POLYESTER COATING COMPOSITION

BACKGROUND OF THE INVENTION

The fire and health hazards of coating compositions in standard organic solvent form are well known. These problems have been solved in various technical areas by substitution of water as the solvent. Water soluble polyester compositions are described in Amoco Chemical Corporation Bulletin "TMA-120a/Resins WS-549/WS-5490" where water-soluble alkyd resins containing linoleic fatty acid, soya oil, trimethylolpropane, isophthalic anhydride and trimellitic anhydride were suggested for industrial coatings on farm implements and automotive engines. Laganis, in U.S. Pat. No. 3,108,083, describes a system for metal containers which comprises tricarboxylic acid, saturated aliphatic dicarboxylic acid, saturated aliphatic dihydric alcohol, water soluble phenolic resin, water soluble melamine, urea or acetone-formaldehyde, and a combination of methyl cellulose and tall oil or ricinoleic acid.

In the area of electrical insulation, Thomas and Garland, in U.S. Pat. No. 4,130,520, provided coatings having high heat resistance and high bond strength. Thomas and Garland used an aromatic dicarboxylic acid, saturated aliphatic dicarboxylic acid, unsaturated aliphatic dicarboxylic acid, saturated aliphatic dihydric alcohol, alicyclic dihydric diol, an organic compound selected from a tris (hydroxy alkyl) isocyanurate or a trihydric alcohol, an amine neutralizing base and butyl cellosolve. These coatings were useful as insulation and provided thermal ratings of up to 200° C., and 2 mil bond strengths, after cure at 150° C., of 26 to 28 pounds at room temperature and 5 to 9 pounds at 100° C. What was needed in the area of motor insulation, however, was a coating having even higher cured bond strengths at room and at elevated temperatures.

Laganis, in U.S. Pat. No. 4,179,420, achieved up to 55 pound bond strengths at room temperature and up to about 6 pound bond strengths at 150° C. There, the polyester paint type protective composition could comprise aromatic dicarboxylic acid, saturated aliphatic dicarboxylic acid, unsaturated aliphatic dicarboxylic acid, saturated aliphatic dihydric alcohol, and trihydric alcohol. This was modified with saturated or unsaturated fatty acids, tall oil and similar type oils, and melamine-formaldehyde resins.

Laganis, in U.S. Pat. No. 4,196,109 provided impregnating, electrical insulation varnishes having improved moisture resistance and extremely high bond strengths. There, the polyester was essentially the same as in the U.S. Pat. No. 4,179,420 patent, and could contain saturated aliphatic dicarboxylic acids and saturated aliphatic dihydric alcohols, but specific water soluble ortho or para substituted monoalkylphenol-phenolic hydroxy-hydrobenzoic acid mixtures were included. These particular phenolics, at 50% concentration, provided bond strengths of up to 52 pounds at room temperature and up to 17.8 pounds at 150° C. Laganis, in this patent, described traditional, unmodified water-soluble phenol-formaldehyde resins as being incompatible with water-soluble alkyl systems after baking to cure; cloudy, hazy or striated cured films being formed. The complicated phenolic resins used by Laganis would add to materials and blending costs.

The search continues for even more sophisticated water dispersible polyester resin solutions which can be used, specifically as insulation for motors operating at high temperatures, where compatible, cured thin films are required, and where 150° C. bond strengths of between 23 and 30 pounds, and shelf lives at least about three months are highly desirable.

SUMMARY OF THE INVENTION

A high bond strength, water reducible phenol modified polyester resin is provided. This resin comprises: (1) a polyester consisting essentially of: 20 wt.% to 40 wt.% of an organic dicarboxylic acid selected from aromatic dicarboxylic acids, tetrahydrophthalic acid and their mixtures; 28.5 wt.% to 40 wt.% of an organic compound selected from tris (2 hydroxy alkyl) isocyanurate where the alkyl group contains from 2 to 6 carbons, organic polyhydric alcohol containing more than two hydroxyl groups per molecule, such as trimethylol propane and their mixtures; 20 wt.% to 40 wt.% of a saturated or unsaturated fatty acid, which preferably comprises linoleic acid constituents; 5 wt.% to 10 wt.% of a tricarboxylic acid, such as trimellitic anhydride; and an amount of organic solvent, such as butyl "cellosolve", effective to provide between a 65% to 85% solids solution; and (2) a phenolic resin component consisting essentially of: an aqueous 45% to 55% solids, unmodified phenol-formaldehyde resin component added between 8 wt.% and 30 wt.% based on the polyester solids, the unmodified phenol-formaldehyde resin having an average molecular weight of between about 200 and about 275; 20 wt.% to 55 wt.%, based on the polyester solids, of water soluble aminoplast, such as melamineformaldehyde condensation products, an amount of neutralizing base, such as dimethylethanolamine, effective to provide a pH of between 8 and 9.5 for the polyester-phenol resin solution; and an amount of organic solvent, such as butyl "cellosolve", effective to provide a final solids content of between 30% to 70% for the polyester-phenol resin solution.

The composition of this invention is free of both saturated aliphatic dicarboxylic acids and saturated aliphatic dihydric alcohols, as both of these reactants tend to build straight chain materials having reduced bond strengths. This composition is also free of alkyl phenols. It is to be understood throughout this specification that the term "acid" is herein meant to include corresponding anhydrides, and that the term "unmodified phenol-formaldehyde resin" is meant to include only phenol of the formula $C_6H_5OH$-formaldehyde resins, not including any alkyl phenol components.

This water reducible resin provides an outstanding insulation, and can provide coatings having thermal ratings of up to 200° C., and shelf lives (time to gel) of at least 3 months at 25° C. In addition, the coatings can be characterized as providing smooth, clear, compatible 2 mil thick cured films having bond strengths of up to about 50 pounds at room temperatures and about 25 pounds at 150° C. The use of low molecular weight, unmodified phenol-formaldehyde resins, within the molecular weight range specified above, is in a large part responsible for these outstanding properties. This resin thus provides outstanding insulation for transformer, electrical grade steel, and motors operating at high temperatures.

DESCRIPTION OF THE PREFERRED EMBODIMENTS

The method of this invention involves an esterification process where 20 wt.% to 40 wt.% of an organic dicarboxylic acid selected from the group consisting of aromatic dicarboxylic acids, tetrahydrophthalic acid, and their mixtures; is admixed, in a flask using an air condenser and minimum $N_2$ sparge, with 28.5% to 40 wt.% of an organic compound selected from the group consisting of tris (2 hydroxy alkyl) isocyanurate where the alkyl group contains from 2 to 6 carbon atoms, preferably ethyl, organic polyhydric alcohols containing more than two hydroxy groups per molecule, and their mixtures; and 20 wt.% to 40 wt.% of a saturated or unsaturated fatty acid having from 8 to 18 carbon atoms. This mixture is then heated between about 160° C. and 180° C., and then, over a 2 hour to 4 hour period, the temperature of the mixture is increased to between about 210° C. and 245° C. and held until an acid value of 10 or below is reached.

The mixture is then cooled to between about 140° C. and 160° C. and then 5 wt.% to 10 wt.% of a tricarboxylic acid is added while raising the reaction temperature to between about 165° C. and 175° C. and holding that temperature for 2 hours to 4 hours until an acid value of about 30 to 60, preferably 50 to 55, is reached. This provides a polyester resin component which is then cooled to about 140° C. Preferably the tricarboxylic acid will constitute from 6 mole% to 13.5 mole% of the polyester, based on total moles of the reactants making up the polyester. An amount of solvent is then added effective to provide between a 65% to 85% solids solution, which is then cooled to about 25° C.

To this polyester resin component is cold blended a phenolic resin component consisting essentially of: 8 wt.% to 30 wt.%, based on the polyester solids, of an aqueous 45% to 55% solids phenol-formaldehyde resin components where the phenol-formaldehyde resin has an average molecular weight below about 275, preferably between about 200 and about 275; 20 wt.% to 55 wt.%, based on the polyester solids, of a water soluble aminoplast selected from the group consisting of urea-formaldehyde, condensation products and melamine-formaldehyde condensation products; and an amount of water and solvent, where the weight ratio of water:solvent can vary from 95:5 to 5:95, effective to provide between a 20% to 70% solids solution. An amount of neutralizing base is then added effective to provide a pH of between 8 and 9.5 for the phenol modified polyester resin solution.

Suitable aromatic dicarboxylic acids include, for example, phthalic acid, terephthalic acid, and preferably isophthalic acid, their anhydrides and their mixtures. Suitable organic polyhydric alcohols containing more than two hydroxyl groups per molecule include, for example, glycerine, pentaerythritol, dipentaerythritol, trimethylol ethane, and preferably trimethylol propane, and their mixtures. Suitable unsaturated fatty acids are linolenic, ricinoleic, oleic, elaeostearic, and preferably linoleic, and the like and fatty acid mixtures from soybean oil, cottenseed oil, linseed oil and tall oil. Suitable saturated fatty acids are pelargonic, octanoic, lauric, myristic, palmitic, stearic and isodecanoic.

A straight, non-alkyl, unmodified phenolic resin is used as the most important modifier of the polyester resin. The preferred water soluble, unmodified phenol-formaldehyde resin is the reflx reaction product of about 1.3 moles of phenol ($C_6H_5OH$, molecular weight=94), 1.8 moles of formaldehyde as 37% formalin, and from 0.004 mole to 0.032 mole of a suitable catalyst, well known in the art, for example metal salt catalysts, such as calcium hydroxide, barium hydroxide, and the like. These materials are mixed heated up to 100° C. and then refluxed at between about 100° C. and about 102° for about 10 to about 50 minutes, after which the phenol-formaldehyde resin is quickly cooled to 25° C., providing a water soluble phenol-formaldehyde resin solution. The unmodified phenol-formaldehyde resin in this solution has a critical molecular weight range below about 275, preferably between about 200 and about 275. Molecular weights of the phenol-formaldehyde resin over about 275 are believed to cause a decrease of the water solubility, a decrease in compatibility with the polyester and provide a marginal shelf life in the phenol modified polyester. Use of catalyst over the range specified, or lengthening the reflux time over about 50 minutes, can provide molecular weight ranges over the invention ranges described above.

Useful aminoplasts include, for example, urea-formaldehyde condensation products and melamine-formaldehyde condensation products, such as hexamethoxy methyl melamine, hydroxymethoxy methyl melamine, trimethoxy methyl melamine, trimethylol melamine and the like. Useful neutralizing bases include, for example, aliphatic organic amines, such as triethanolamine, triethyl amine, 2amino-2-methyl-1-propanol, dimethylamino-2-methyl-1-propanol, and preferably dimethylethanolamine, and the like. Suitable organic solvents include, for example, ethylene glycol monoalkyl ethers, such as glycol monobutyl ether (butyl "cellosolve") and diethylene glycol monobutyl ether (butyl "carbitol"); ethylene glycol monoalkyl acetates and ketones, having flash points over about 150° C.

Saturated aliphatic dicarboxylic acid reactants, such as adipic acid, succinic acid, sebacic acid, glutaric acid and the like are excluded from the composition of this invention, having been found to reduce bond strength properties. Saturated aliphatic dihydric alcohol reactants, such as ethylene glycol, propylene glycol, neopentylglycol 1,3-butylene glycol, 2,2-diethylpropanediol, hexylene glycol and the like are also excluded, having also been found to contribute to reducing bond strength properties of the resin system. These materials have not heretofore been recognized as contributing to reduced bond strength values. Also excluded are alkyl phenol type resins as heretofore described.

The advantages of the phenol modified polyester coating composition of this invention are its outstanding chemical resistance, as well as its outstanding bond strength at 150° C. Being an aqueous system, fire hazard problems as well as pollution problems are eliminated. In addition, it has good moisture resistance and good wetting and adhesion on metal substrates.

EXAMPLE

A water reducible phenolic modified polyester insulating coating composition was made by adding 535 grams (32.8 wt.%) of linoleic fatty acid, 502 grams (30.9 wt.%) of trimethylol propane polyhydric alcohol, and 4495 grams. (27.5 wt.%) of isophthalic acid to a flask using an air condenser and minimum $N_2$ sparge. The admixture was heated to 176° C., and the temperature was increased to 238° C. over a 3 hour period until the acid value was about 9.5. The admixture was cooled to about 145° C. and then 147.5 grams (9.0 wt.%, 12.3 mole% based on total reactants) of trimellitic anhydride was added and the mixture heated to about 168° C. and held there for about 3 hours to an acid value of about 53. This provides a polyester resin component which is then cooled to about 140° C. Finally, 486.8 grams of butyl "cellosolve" solvent was added to provide a 75% solids polyester. This polyester had an OH/COOH ratio of 1.05. The polyester was then cooled.

To 65 grams of this polyester resin solution was added 13.7 grams (28 wt.% based on the polyester solids) of water soluble 50% solids, unmodified phenol-formaldehyde resin, and 24.6 grams (50 wt.% based on the polyester solids) of water soluble hexamethoxy methyl melamine resin. To this modified polyester was then added 24.1 grams of water with 6.9 grams of butyl "cellosolve", maintaining a 3.5:1 weight ratio of water:-solvent, and a small effective amount of dimethyle-thanolamine neutralizing base to provide a pH of 9.2.

The phenol-formaldehyde resin was made by: mixing about 1.3 moles of straight, unmodified phenol ($C_6H_5OH$, molecular weight=94), 1.8 moles of formaldehyde as 37% formalin and from 0.004 mole to 0.032 mole of barium hydroxide catalyst, heating to 100° C. and then refluxing at between about 100° C. and about 102° C. for only about 30 to 45 minutes, so as not to produce a high molecular weight material, and then cooling quickly to 25° C. This provided a water soluble phenol-formaldehyde resin solution, where the phenol-formaldehyde resin had an average molecular weight of 225, as determined by gel permeation chromatography.

The above phenol modified polyester was found to have the following properties, as set forth in Table 1:

TABLE 1

| | |
|---|---|
| Solids Content | 60% |
| Viscosity (Demmler #1,25° C.) | 250 to 370 seconds |
| Gel Time, 35° C. | 60 to 90 minutes |
| Dielectric Strength-dry | 4,000 volts/mil. |
| Dielectric Strength-wet | 3,500 volts/mil. |
| Cake Hardness (6 hr, 135° C., Shore D) | 40/35 |
| Thermal Life Endurance | |
| IEEE 20,000 hrs. | 195° C. |
| Shelf Life at 25° C. | 4 months minimum |

The above phenol modified polyester was coated onto flat steel panels and cured for 1 hour at 175° C. to provide a clear, smooth insulating film about 2 mils thick. The clearness indicated the compatibility of the phenol-polyester blend. This phenol modified polyester was also coated onto a helical coil in two dipping operations providing a total build of 2 mils (0.002"). After each dip the resin was cured for 1 hour at 175° C. Bondstrength to break was ASTM D-2519 measured on five samples, as set forth in Table 2:

TABLE 2

| Temp. of break | 25° C. | 150° C. | 180° C. | 200° C. | 220° C. |
|---|---|---|---|---|---|
| Pounds to break | 50 lbs. | 25 lbs. | 19 lbs. | 9 lbs. | 6 lbs. |

As can be seen, outstanding electrical properties, toughness, and thermal life endurance are provided. Bond strengths at 150° C. are easily over the 23 pounds desired for motors operating at high temperatures, and good bond strength is even provided at 220° C. Other phenol modified polyester resins where the unmodified phenol-formaldehyde resin component had an average molecular weight of 295 were prepared for comparative purposes. Such higher molecular weight phenolic-modified polyesters were found to have a short shelf life at 25° C. of about 2 weeks, and provided a hazy phenolic solution.

I claim:
1. A water reducible composition, comprising:
(I) a polyester resin consisting essentially of the reaction product of: (a) an organic dicarboxylic acid selected from the group consisting of aromatic dicarboxylic acids, tetrahydrophthalic acid, and mixtures thereof; (b) an organic compound selected from tris(2 hydroxy alkyl)isocyanurate, where the alkyl group contains from 2 to 6 carbon atoms, and organic polyhydric alcohols containing more than two hydroxyl groups per molecule, and mixtures thereof; (c) saturated fatty acid, and (d) tricarboxylic acid; and
(II) additive consisting essentially of: (a) 8 wt.% to 30 wt.%, based on 100% polyester solids, of an aqueous solution of a water soluble, unmodified phenol-formaldehyde resin having an average molecular weight of below about 275; and (b) 20 wt.% to 55 wt.%, based on the polyester solids, of water soluble aminoplast selected from the group consisting of urea-formaldehyde condensation products and melamine-formaldehyde condensation products, to provide a water reducible composition; where the composition is free of saturated aliphatic dicarboxylic acid and saturated aliphatic dihydric alcohol reactants.

2. The composition of claim 1, cured at 175° C., characterized as having a 2 mil. bond strength at 150° C. of over 23 pounds.

3. A water reducible, high bond strength, modified polyester resin consisting essentially of:
(I) a polyester resin consisting essentially of the reaction product of:
(A) an admixture consisting essentially of:
(a) 20 wt.% to 40 wt.% of an organic dicarboxylic acid selected from the group consisting of aromatic dicarboxylic acids, tetrahydrophthalic acid, and mixtures thereof;
(b) 25.8 wt.% to 40 wt.% of an organic compound selected from tris (2 hydroxy alkyl) isocyanurate, where the alkyl group contains from 2 to 6 carbon atoms, and organic polyhydric alcohols containing more than two hydroxyl groups per molecule, and mixtures thereof; and
(c) 20 wt.% to 40 wt.% of a saturated or unsaturated fatty acid; and
(B) 5 wt.% to 10 wt.% of a tricarboxylic acid, to form a polyester resin; and an amount of solvent effective to provide a polyester solution, and
(II) additive consisting of:
(a) 8 wt.% to 30 wt.%, based on the polyester solids, of an aqueous 45% to 55% solids solution of a water soluble, unmodified phenol-formaldehyde resin having an average molecular weight of between about 200 and about 275; and
(b) 20 wt.% to 55 wt.%, based on the polyester solids, of water soluble aminoplast selected from the group consisting of urea-formaldehyde condensation products and melamine-formaldehyde condensation products, and
an amount of solvent effective to provide a 30% to 70% solids solution of water-reducible, modified polyester resin, where the modified polyester resin is free of saturated aliphatic dicarboxylic acid and saturated aliphatic dihydric alcohol reactants.

4. The modified resin of claim 3, wherein the solvent of (II) is added with water, where the weight ratio of water:solvent is from 95:5 to 5:95.

5. The modified polyester resin of claim 3, having added thereto an amount of neutralizing base effective to provide a pH of between 8 to 9.5 for the phenol modified polyester resin solution where said resin solution is characterized as having a shelf life at 25° C. of over 3 months.

6. The modified polyester resin of claim 3, wherein the organic dicarboxylic acid of (I) (A) (a) is an aromatic dicarboxylic acid, the organic compound of (I) (A) (b) is an organic polyhydric alcohol containing more than two hydroxyl groups per molecule, the fatty acid of (I) (A) (c) has from 8 to 18 carbon atoms, the unmodified phenol-formaldehyde resin of (II) (2) is the 10 to 50 minute condensation reaction product, at about 100° C. to about 102° C., of about 1.3 moles of phenol ($C_6H_5OH$), 1.8 moles of formaldehyde as 37% formalin and from about 0.004 mole to 0.032 mole of catalyst, and the aminoplast of (II) (b) is a melamine-formaldehyde condensation product.

7. The modified polyester of claim 6, wherein the aromatic dicarboxylic acid is isophthalic acid, the organic polyhydric alcohol containing more than two hydroxyl groups per molecule is trimethylol propane, the fatty acid is linoleic fatty acid, and the organic solvent is glycol monobutyl ether, the tricarboxylic acid is trimellitic anhydride, and the catalyst used in the unmodified phenol-formaldehyde resin is barium hydroxide.

8. The modified polyester resin of claim 3, cured at 175° C., characterized as having a 2 mil bond strength at 150° C. of over 23 pounds.

9. The composition of claim 1, having added thereto an amount of neutralizing base effective to provide a pH of between 8 to 9.5 for the phenol modified polyester resin solution where the aqueous solution of phenol-formaldehyde has a solids content of between 45% and 55%, and said resin solution is characterized as having a shelf life at 25° C. of over 3 months.

* * * * *